(12) United States Patent
Creviston et al.

(10) Patent No.: US 8,692,425 B2
(45) Date of Patent: Apr. 8, 2014

(54) COOLING COMBINATIONS FOR ELECTRIC MACHINES

(75) Inventors: Alex S. Creviston, Muncie, IN (US); Bradley D. Chamberlin, Pendleton, IN (US); Larry Kubes, Indianapolis, IN (US)

(73) Assignee: Remy Technologies, LLC, Pendleton, IN (US)

( * ) Notice: Subject to any disclaimer, the term of this patent is extended or adjusted under 35 U.S.C. 154(b) by 265 days.

(21) Appl. No.: 13/104,843

(22) Filed: May 10, 2011

(65) Prior Publication Data

US 2012/0286596 A1 Nov. 15, 2012

(51) Int. Cl.
*H02K 9/00* (2006.01)

(52) U.S. Cl.
USPC .................................. 310/59; 310/58; 310/89

(58) Field of Classification Search
CPC .................................. H02K 9/08; H02K 9/19
USPC ...................... 310/52, 54, 58–59, 89
See application file for complete search history.

(56) References Cited

U.S. PATENT DOCUMENTS

| | | | |
|---|---|---|---|
| 2,080,678 A | 5/1937 | Van Horn et al. | |
| 2,264,616 A | 12/1941 | Buckbee | |
| 3,447,002 A | 5/1969 | C. Ronnevig | |
| 3,525,001 A | 8/1970 | Erickson | |
| 3,748,507 A | 7/1973 | Sieber | |
| 4,038,570 A | 7/1977 | Durley, III | |
| 4,286,183 A * | 8/1981 | Montgomery | 310/62 |
| 5,081,382 A | 1/1992 | Collings et al. | |
| 5,180,004 A | 1/1993 | Nguyen | |
| 5,207,121 A | 5/1993 | Blen | |
| 5,293,089 A | 3/1994 | Frister | |
| 5,372,213 A | 12/1994 | Hasebe et al. | |
| 5,519,269 A | 5/1996 | Lindberg | |
| 5,616,973 A | 4/1997 | Khazanov | |
| 5,859,482 A | 1/1999 | Crowell et al. | |
| 5,912,516 A | 6/1999 | Atkinson et al. | |
| 5,923,108 A | 7/1999 | Matake et al. | |
| 5,937,817 A | 8/1999 | Schanz et al. | |
| 5,939,808 A * | 8/1999 | Adames | 310/89 |
| 5,965,965 A | 10/1999 | Umeda et al. | |
| 6,011,332 A | 1/2000 | Umeda et al. | |

(Continued)

FOREIGN PATENT DOCUMENTS

| | | |
|---|---|---|
| JP | 05-103445 A | 4/1993 |
| JP | 05-292704 A | 11/1993 |

(Continued)

OTHER PUBLICATIONS

International Search Report, Received Jan. 9, 2012.
International Search Report, Received Feb. 16, 2012.
International Search Report, Received Dec. 22, 2011.
International Search Report, Received Dec. 5, 2011.
International Search Report, Received Dec. 27, 2011.

(Continued)

*Primary Examiner* — Thanh Lam
(74) *Attorney, Agent, or Firm* — Greenberg Traurig, LLP

(57) ABSTRACT

Some embodiments of the invention provide an electric machine module comprising a housing including a sleeve member and at least one end cap. In some embodiments, the sleeve member can include a first coolant jacket and a second coolant jacket. Also, in some embodiments, the end cap can include an end cap coolant jacket. Also, some embodiments provide an electric machine including stator end turns, housing at least partially enclosing the electric machine, and an end cap coolant jacket positioned substantially axially outward relative to at least one of the stator end turns.

20 Claims, 4 Drawing Sheets

(56) References Cited

U.S. PATENT DOCUMENTS

| | | | |
|---|---|---|---|
| 6,069,424 A | 5/2000 | Colello et al. | |
| 6,075,304 A | 6/2000 | Nakatuska | |
| 6,087,746 A | 7/2000 | Couvert | |
| 6,095,754 A | 8/2000 | Ono | |
| 6,097,130 A | 8/2000 | Umeda et al. | |
| 6,114,784 A | 9/2000 | Nakano | |
| 6,147,430 A | 11/2000 | Kusase et al. | |
| 6,147,432 A | 11/2000 | Kusase et al. | |
| 6,173,758 B1 | 1/2001 | Ward et al. | |
| 6,181,043 B1 | 1/2001 | Kusase et al. | |
| 6,183,208 B1 * | 2/2001 | Qandil et al. | 417/201 |
| 6,201,321 B1 | 3/2001 | Mosciatti | |
| 6,208,060 B1 | 3/2001 | Kusase et al. | |
| 6,218,747 B1 | 4/2001 | Tsuruhara | |
| 6,232,687 B1 | 5/2001 | Hollenbeck et al. | |
| 6,242,836 B1 | 6/2001 | Ishida et al. | |
| 6,291,918 B1 | 9/2001 | Umeda et al. | |
| 6,300,693 B1 | 10/2001 | Poag et al. | |
| 6,313,559 B1 | 11/2001 | Kusase et al. | |
| 6,333,537 B1 | 12/2001 | Nakamura | |
| 6,335,583 B1 | 1/2002 | Kusase et al. | |
| 6,346,758 B1 | 2/2002 | Nakamura | |
| 6,359,232 B1 | 3/2002 | Markovitz et al. | |
| 6,404,628 B1 | 6/2002 | Nagashima et al. | |
| 6,417,592 B2 | 7/2002 | Nakamura et al. | |
| 6,459,177 B1 | 10/2002 | Nakamura et al. | |
| 6,509,665 B1 | 1/2003 | Nishiyama et al. | |
| 6,515,392 B2 | 2/2003 | Ooiwa | |
| 6,522,043 B2 | 2/2003 | Measegi | |
| 6,559,572 B2 | 5/2003 | Nakamura | |
| 6,579,202 B2 | 6/2003 | El-Antably et al. | |
| 6,770,999 B2 | 8/2004 | Sakuraki | |
| 6,897,594 B2 | 5/2005 | Ichikawa et al. | |
| 6,903,471 B2 | 6/2005 | Arimitsu et al. | |
| 6,998,749 B2 | 2/2006 | Wada et al. | |
| 7,002,267 B2 | 2/2006 | Raszkowski et al. | |
| 7,026,733 B2 | 4/2006 | Bitsche et al. | |
| 7,042,124 B2 | 5/2006 | Puterbaugh et al. | |
| 7,057,313 B2 * | 6/2006 | Buis et al. | 310/12.29 |
| 7,239,055 B2 | 7/2007 | Burgman et al. | |
| 7,276,006 B2 | 10/2007 | Reed et al. | |
| 7,284,313 B2 | 10/2007 | Raszkowski et al. | |
| 7,339,300 B2 | 3/2008 | Burgman et al. | |
| 7,352,091 B2 | 4/2008 | Bradfield | |
| 7,402,923 B2 | 7/2008 | Klemen et al. | |
| 7,417,344 B2 | 8/2008 | Bradfield | |
| 7,508,100 B2 | 3/2009 | Foster | |
| 7,538,457 B2 | 5/2009 | Holmes et al. | |
| 7,545,060 B2 | 6/2009 | Ward | |
| 7,592,045 B2 | 9/2009 | Smith et al. | |
| 7,615,903 B2 | 11/2009 | Holmes et al. | |
| 7,615,951 B2 | 11/2009 | Son et al. | |
| 7,667,359 B2 | 2/2010 | Lee et al. | |
| 7,939,975 B2 | 5/2011 | Saga et al. | |
| 8,067,865 B2 | 11/2011 | Savant | |
| 8,068,327 B2 | 11/2011 | Seifert et al. | |
| 2003/0222519 A1 | 12/2003 | Bostwick | |
| 2004/0036367 A1 | 2/2004 | Denton et al. | |
| 2004/0189110 A1 | 9/2004 | Kazumasa | |
| 2004/0195929 A1 | 10/2004 | Oshidari | |
| 2005/0023266 A1 | 2/2005 | Ueno et al. | |
| 2005/0023909 A1 | 2/2005 | Cromas | |
| 2005/0194551 A1 | 9/2005 | Klaussner et al. | |
| 2005/0274450 A1 | 12/2005 | Smith et al. | |
| 2005/0285456 A1 | 12/2005 | Amagi et al. | |
| 2007/0024130 A1 | 2/2007 | Schmidt | |
| 2007/0052313 A1 | 3/2007 | Takahashi | |
| 2007/0063607 A1 | 3/2007 | Hattori | |
| 2007/0145836 A1 | 6/2007 | Bostwick | |
| 2007/0149073 A1 | 6/2007 | Klaussner et al. | |
| 2007/0216236 A1 | 9/2007 | Ward | |
| 2008/0168796 A1 * | 7/2008 | Masoudipour et al. | 62/505 |
| 2008/0223557 A1 | 9/2008 | Fulton et al. | |
| 2009/0121562 A1 | 5/2009 | Yim | |
| 2009/0174278 A1 | 7/2009 | Sheaffer et al. | |
| 2009/0206687 A1 | 8/2009 | Woody et al. | |
| 2010/0007227 A1 * | 1/2010 | Smith et al. | 310/64 |
| 2010/0026111 A1 | 2/2010 | Monzel | |
| 2010/0102649 A1 | 4/2010 | Cherney et al. | |
| 2010/0109454 A1 | 5/2010 | Vadillo et al. | |
| 2010/0176668 A1 | 7/2010 | Murakami | |
| 2011/0050141 A1 | 3/2011 | Yeh et al. | |
| 2011/0101700 A1 | 5/2011 | Stiesdal | |
| 2011/0109095 A1 | 5/2011 | Stiesdal | |

FOREIGN PATENT DOCUMENTS

| | | |
|---|---|---|
| JP | 06-036364 U | 5/1994 |
| JP | 06-311691 A | 11/1994 |
| JP | 07-264810 A | 10/1995 |
| JP | 08-019218 A | 1/1996 |
| JP | 09-046973 A | 2/1997 |
| JP | 09-154257 A | 6/1997 |
| JP | 10-234157 A | 9/1998 |
| JP | 11-132867 A | 5/1999 |
| JP | 11-206063 A | 7/1999 |
| JP | 2000-152563 A | 5/2000 |
| JP | 2000-324757 A | 11/2000 |
| JP | 2000-333409 A | 11/2000 |
| JP | 2001-333559 A | 11/2001 |
| JP | 2002-095217 A | 3/2002 |
| JP | 2002-119019 A | 4/2002 |
| JP | 2003-250247 A | 9/2003 |
| JP | 2003-299317 A | 10/2003 |
| JP | 2003-324901 A | 11/2003 |
| JP | 2004-215353 A | 7/2004 |
| JP | 2004-236376 A | 8/2004 |
| JP | 2004-248402 A | 9/2004 |
| JP | 2004-297924 A | 10/2004 |
| JP | 2004-312886 A | 11/2004 |
| JP | 2004-357472 A | 12/2004 |
| JP | 2005-012989 A | 1/2005 |
| JP | 2005-057957 A | 3/2005 |
| JP | 2005-168265 A | 6/2005 |
| JP | 2006-060914 A | 3/2006 |
| JP | 2000-152561 A | 9/2006 |
| JP | 2006-297541 A | 11/2006 |
| JP | 2006-528879 A | 12/2006 |
| JP | 2007-282341 A | 10/2007 |
| JP | 2008-021950 A | 2/2008 |
| JP | 2008-206213 A | 9/2008 |
| JP | 2008-219960 A | 9/2008 |
| JP | 4187606 B2 | 11/2008 |
| JP | 2008-544733 A | 12/2008 |
| JP | 2009-247084 A | 10/2009 |
| JP | 2009-247085 A | 10/2009 |
| JP | 2009-254205 A | 10/2009 |
| JP | 2010-028908 A | 2/2010 |
| JP | 2010-028958 A | 2/2010 |
| JP | 2010-035265 A | 2/2010 |
| JP | 2010-063253 A | 3/2010 |
| JP | 2010-121701 A | 6/2010 |
| KR | 10-1997-0055103 A | 7/1997 |
| KR | 10-2000-0013908 A | 3/2000 |
| KR | 10-2006-0102496 A | 9/2006 |
| KR | 10-2007-0027809 A | 3/2007 |
| KR | 10-2009-0048028 A | 5/2009 |

OTHER PUBLICATIONS

International Search Report completed Apr. 19, 2012.
International Search Report completed Apr. 9, 2012.
International Search Report completed Apr. 20, 2012.
International Search Report completed Mar. 8, 2012.
International Search Report completed Apr. 24, 2012.
International Search Report, Received Jul. 31, 2012.
WIPO Search Report and Written Opinion dated Oct. 29, 2012 for corresponding Application No. PCT/US2012/033915; 8 sheets.
WIPO Search Report and Written Opinion dated Nov. 14, 2012 for corresponding Application No. PCT/US2012/040794; 8 sheets.

* cited by examiner

COOLING COMBINATIONS FOR ELECTRIC MACHINES

BACKGROUND

The performance and durability of electric machines can be directly related to the efficiency of the cooling system. Internal resistance increases due to some increased temperature can substantially decrease performance, and for some interior permanent magnet machines can substantially increase the risk of demagnetization. Further, some polymer-based insulation systems can be limited by cumulative damage largely due to elevated temperature operations. As a result, the higher the temperature, the shorter the life of the insulation systems. Maximizing heat extraction capabilities in a cost-effective fashion can extend machine life span.

Some electric machines were originally designed as oil-cooled devices, because of their potential use in transmission applications. Some electric machines can have more-varied applications and restrictions in terms of cooling and complexity. Some of the power electronics of the electric machines can be water-cooled. Also, in some applications, internal combustion engines also can be water cooled. The addition of a separate oil circulation cooling system for the electric machines can give rise to incompatibility with some applications.

In some applications, coolants of high dielectric strength, such as oil, can be problematic. However, for some applications, coolants of high dielectric strength can be preferred for some applications because they can provide a thermally efficient and cost effective solution for heat rejection from the internal components of some electric machines.

SUMMARY

Some embodiments of the invention provide an electric machine module comprising a housing including a sleeve member and at least one end cap. In some embodiments, the sleeve member can include a first coolant jacket and a second coolant jacket. Also, in some embodiments, the end cap can include an end cap coolant jacket. Also, some embodiments provide an electric machine including stator end turns, housing at least partially enclosing the electric machine, and an end cap coolant jacket positioned substantially axially outward relative to at least one of the stator end turns.

Some embodiments of the invention provide an electric machine module comprising a housing including at least one end cap including at least one semi-sealed chamber. In some embodiments, the at least one semi-sealed chamber can include a coolant inlet and a coolant outlet. In some embodiments, a semi-sealed stator cavity can be formed by at least a portion of the electric machine, a portion of the at least one end cap, and the at least one semi-sealed chamber, and at least a portion of the stator end turns can extend into the semi-sealed stator cavity.

Some embodiments of the invention provide an electric machine module comprising a housing including at least one end cap. In some embodiments, the at least one end cap can include a plurality of semi-open chambers. At least one of the plurality of semi-open chambers can include a coolant inlet, and at least one of the plurality of semi-open chambers can include including a coolant outlet. In some embodiments, a semi-open stator cavity can be formed by at least a portion of the electric machine, a portion of the at least one end cap, and at least one of the plurality of semi-open chambers, and at least a portion of the stator end turns can substantially extend into the semi-open stator cavity.

DETAILED DESCRIPTION

Figure 1:
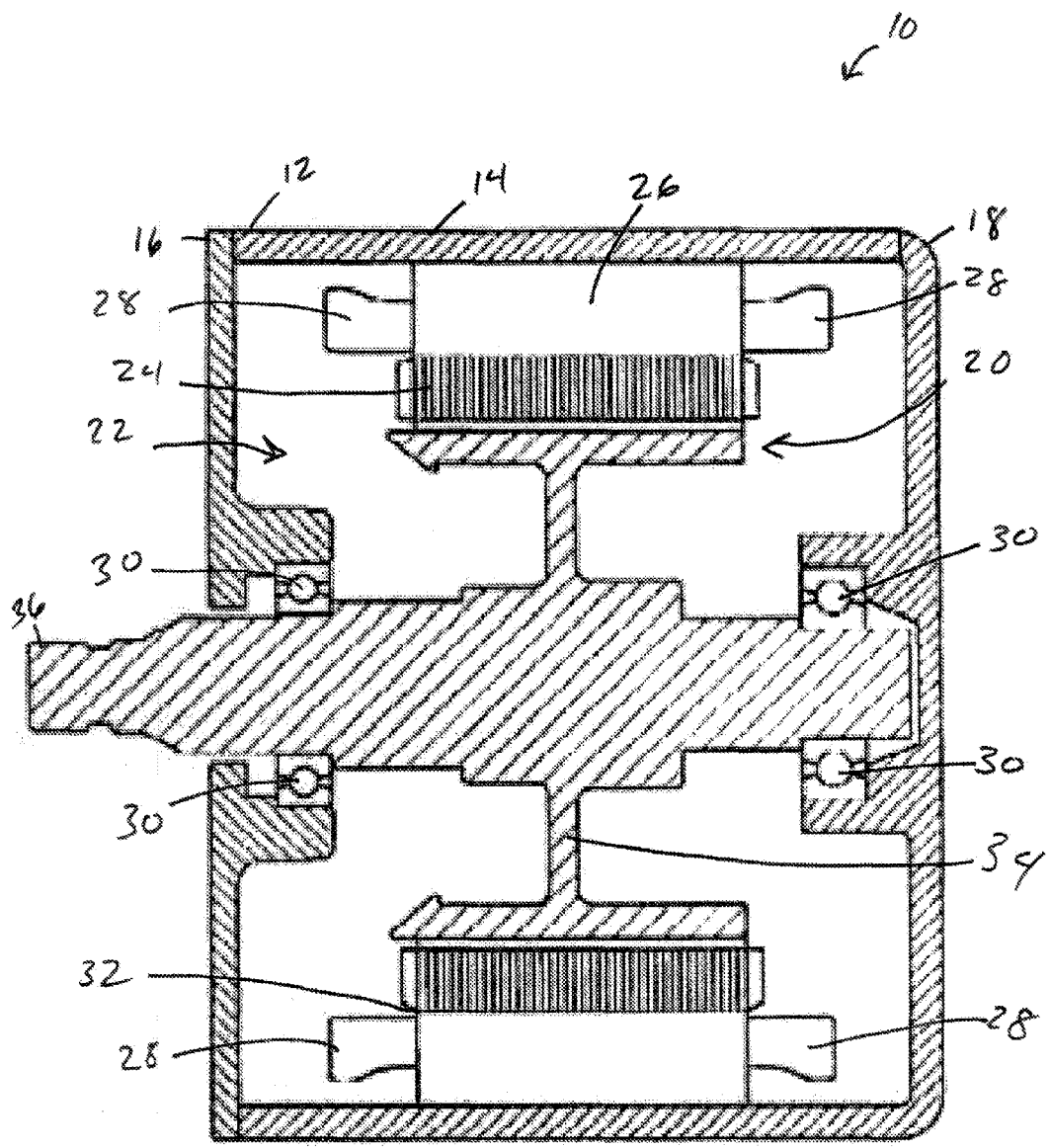
FIG. 1 is a perspective view of an electric machine module according to one embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives that fall within the scope of embodiments of the invention.

FIG. 1 illustrates an electric machine module 10 according to one embodiment of the invention. The electric machine module 10 can include a housing 12 comprising a sleeve member 14, a first end cap 16, and a second end cap 18. An electric machine 20 can be housed within a machine cavity 22 at least partially defined by the sleeve member 14 and the end caps 16, 18. For example, the sleeve member 14 and the end caps 16, 18 can be coupled via conventional fasteners (not shown), or another suitable coupling method, to enclose at least a portion of the electric machine 20 within the machine cavity 22. In some embodiments, the end caps 16, 18 can be identical parts. In other embodiments, the end caps 16, 18 can include different individual features. Moreover, in some embodiments, at least one of the end cap 16, 18 can be integral with the sleeve member 14. Also, in some embodiments, the housing 12 can comprise a substantially enclosed, substantially cylindrical canister and a single end cap (not shown). Further, in some embodiments, the housing 12, including the sleeve member 14 and the end caps 16, 18, can be fabricated from materials which generally include thermally conductive properties, such as, but not limited to aluminum, iron, or steel.

The electric machine 20 can include a rotor 24, a stator assembly 26, including stator end turns 28, and bearings 30, and can be disposed about an output shaft 36. As shown in FIG. 1, the stator 26 can substantially circumscribe the rotor 24, and a radial air gap 32 can be defined between the rotor 24 and the stator 26. In some embodiments, the electric machine 20 can also include a rotor hub 34 or can have a "hub-less" design (not shown). The electric machine 20 can be, without limitation, an electric motor, such as a hybrid electric motor, an electric generator, or a vehicle alternator. In one embodiment, the electric machine 20 can be a High Voltage Hairpin (HVH) electric motor or an interior permanent magnet electric motor for hybrid vehicle applications.

Components of the electric machine 20 such as, but not limited to the rotor 24, the stator assembly 26, and the stator end turns 28 can generate heat during operation of the electric machine 20. These components can be cooled to increase the performance and the lifespan of the electric machine 20.

In some embodiments of the invention, the housing 12 can comprise coolant jackets to aid in cooling the electric machine 20. More specifically, in some embodiments, the sleeve member 14 and at least one of the end caps 16, 18 can include coolant jackets. In some embodiments, both of the end caps 16, 18 can include coolant jackets.

Figure 2:
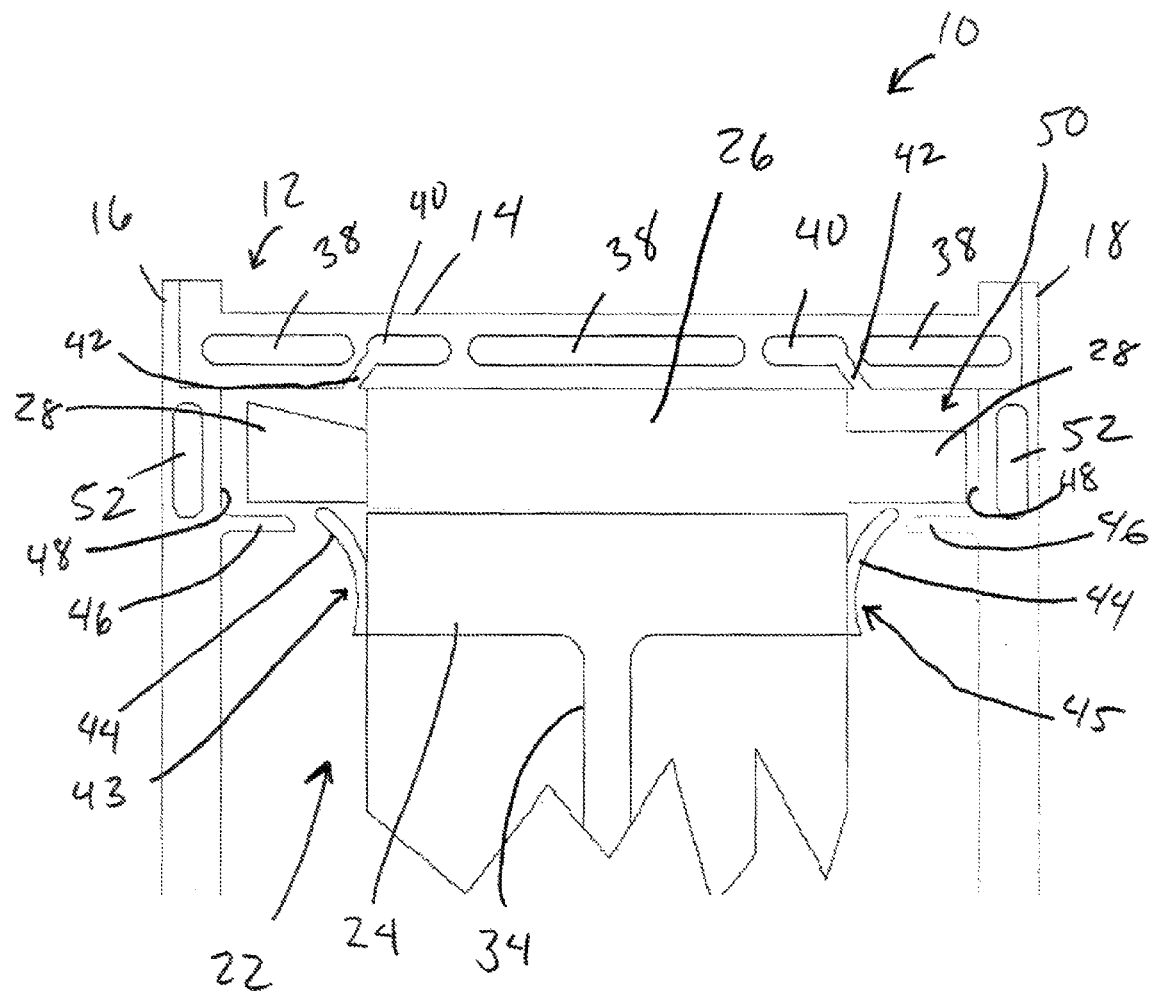
FIG. 2 is a partial cross-sectional view of an electric machine module according to one embodiment of the invention.

Referring to FIG. 2, in some embodiments, the sleeve member 14 can comprise a first coolant jacket 38 and a second coolant jacket 40. In some embodiments, the sleeve member 14 can comprise more than one of each of the first coolant jacket 38 and the second coolant jacket 40, as shown in FIG. 2. For example, in some embodiments, the sleeve member 14 can include three first coolant jackets 38 and two second coolant jackets 40, although the sleeve member 14 can include different numbers of coolant jackets 38, 40 to meet end-user and/or manufacturer needs.

In some embodiments, the first coolant jacket 38 can substantially circumscribe at least a portion of the electric machine 20. More specifically, in some embodiments, the first coolant jacket 38 can substantially circumscribe at least a portion of an outer diameter of the stator assembly 26, including the stator end turns 28. Further, in some embodiments, the first coolant jacket 38 can contain a first coolant. In some embodiments, the first coolant can comprise transmission fluid, ethylene glycol, an ethylene glycol/water mixture, water, oil, or a similar substance. In some embodiments, the first coolant can comprise a relatively low dielectric constant. The first coolant jacket 38 can be in fluid communication with a first coolant source (not shown) which can pressurize the first coolant prior to or as it is being dispersed into the first coolant jacket 38, so that the pressurized first coolant can circulate through the first coolant jacket 38. Also, in some embodiments, a first coolant jacket inlet (not shown) can be positioned at or near a bottom of the housing 12, so that the first coolant enters the first coolant jacket 38 at or near the bottom of the housing 12.

Heat energy generated by the electric machine 12, including the stator assembly 28, can be transferred to the first coolant as it circulates through the first coolant jacket 38. After circulating through the first coolant jacket 38, the first coolant can be directed to a heat-transfer element (e.g., a radiator, a heat exchanger, etc.), which can remove the heat energy from the first coolant and then the first coolant can be recirculated through the first coolant jacket 38.

In some embodiments, as the first coolant circulates through the first coolant jacket 38, it can aid in cooling the electric machine 20. Because the first coolant jacket 38 can largely circumscribe portions of the electric machine 20, as the first coolant circulates through the first coolant jacket 38, it can receive, substantially through convection, a portion of the heat energy radiated by the electric machine 20 during operation. Further, because, in some embodiments, the housing 12 can be fabricated from generally thermally conductive materials, the convection of the heat energy from the electric machine 20 to the first coolant can be partially enhanced due to the thermally conductive nature of the housing 12.

In some embodiments, the second coolant jacket 40 can substantially circumscribe a portion of the electric machine 20. More specifically, in some embodiments, the second coolant jacket 40 can substantially circumscribe at least a portion of the outer diameter of the stator assembly 26, including the stator end turns 28. In some embodiments, the second coolant jacket 40 can contain a second coolant. In some embodiments, the second coolant can comprise an oil, including motor oil, transmission oil, or another similar oil, or the second coolant can comprise a similar liquid comprising a similar dielectric constant. Additionally, in some embodiments, the first coolant and/or the second coolant can substantially comprise a gas, a coolant mist, or a coolant fog. Moreover, in some embodiments, as the second coolant circulates through the second coolant jacket 40, it can receive a portion of the heat energy being transported by the first coolant located in the first coolant jacket 38 and vice versa.

In some embodiments, the second coolant jacket 40 can include coolant apertures 42. More specifically, in some embodiments, the coolant apertures 42 can be defined through an inner wall 43 of the sleeve member 14 so that the second coolant jacket 40 is in fluid communication with the machine cavity 22. In some embodiments of the invention, the coolant apertures 42 can be positioned in a substantially upper half of the sleeve member 14, however, in other embodiments, the coolant apertures 42 can be positioned substantially along other portions of the inner wall 43 of the sleeve member 14. In some embodiments, each of the second coolant jackets 40 included in the sleeve member 14 can include coolant apertures 42, although, in some embodiments, some of the second coolant jackets 40 need not include coolant apertures 42. Further, in some embodiments, the second coolant jacket 40 can be in fluid communication with a second coolant source (not shown) which can pressurize the second coolant prior to or as it is being dispersed into the second coolant jacket 40, so that the pressurized second coolant can circulate through the second coolant jacket 40 and a portion of the second coolant can be dispersed into the machine cavity 22.

In some embodiments, the coolant apertures 42 can be positioned substantially radially outward relative to stator assembly 28. For example, in some embodiments, the coolant apertures 42 can be located in the sleeve member 14 so that a portion of the second coolant disbursed through the coolant apertures 42 can be guided toward, and can substantially contact the stator end turns 28, as shown in FIG. 2, which can lead to at least partial cooling of the stator end turns 28.

According to some embodiments of the invention, the module 10 can include a slinger 44 to aid in cooling the electric machine 20. In some embodiments of the invention, the rotor 24 can include generally opposing end faces 43, 45. In some embodiments, the slinger 44 can be operatively coupled to the rotor 24 and/or the rotor hub 34 proximal to the generally opposing end faces 43, 45 and can extend into the machine cavity 22 and can be proximal to, and can be generally radially inward from the stator end turns 28. More specifically, at least a portion of the slinger 44 can be coupled to the rotor 24 and/or the rotor hub 34 so that the slinger 44 substantially synchronously rotates with the rotor 24 and the rotor hub 34 when the electric machine 20 is in operation. The slinger 44 can be coupled to the rotor 24 and/or the rotor hub 34 using threads, pins, one or more threaded fasteners, a friction fitting, welding, or another conventional coupling manner. In some embodiments, the slinger 44 can comprise a substantially planar configuration (not shown), in which the slinger 44 generally axially extends from the generally opposing end faces 43, 45 and generally does not extend in a substantially radial direction. In other embodiments, the slinger 44 can comprise a substantially curved and/or arced configuration, as shown in FIG. 2. Furthermore, the slinger 44 can comprise multiple forms that can be employed to meet end-user and/or manufacturer needs.

Additionally, in some embodiments, the slinger 44 can comprise different configurations. In some embodiments, the slinger 44 can comprise a substantially passive device operatively coupled to the rotor 24 and/or the rotor hub 34, as previously mentioned. In some embodiments, the slinger 44 can comprise a centrifugal disc pump (not shown) operatively coupled to the electric machine 20 so that the slinger 44 could generally operate using the movement of the electric machine 20. In other embodiments, the slinger 44 can comprise a structure capable of movement independent of the electric machine 20, such as a secondary machine (not shown) operatively coupled to the electric machine 20.

In some embodiments, the slinger 44 can aid in cooling the electric machine 20. In some embodiments, after some of the second coolant is dispersed from the second coolant jacket 40, through the coolant apertures 42, and generally onto or near to the stator end turns 28, the second coolant can receive a portion of the heat energy from the stator end turns 28, which can result in partial cooling of the electric machine 20. A portion of the second coolant can be dispersed radially beyond the stator end turns 28, or for example, splash or drip from the stator end turns onto the slinger 44. More specifically, in some embodiments, a portion of the second coolant that comes in contact with the stator end turns 28 can continue to flow radially inward toward the slinger 44. As the second coolant reaches the slinger 44, a portion of the second coolant can be substantially radially slung back outward on to the stator end turns 28 because of the rotation of the slinger 44 in synchronicity with the rotor 24. The process of radially slinging the coolant toward the stator end turns 28 can serve to recycle the second coolant, which can increase the cooling potential of the second coolant. In some embodiments, the slinger 44 can provide further cooling to the stator end turns 28 more so than simply the direct cooling affected by direct spraying of the second coolant on to and near the stator end turns 28. Further, the slinger 44 can increase the amount of time the second coolant contacts the stator end turns 28 as well as the impingement velocity of the second coolant because of the slinging effect.

According to some embodiments of the invention, a cover 46 can be coupled to an inner wall 48 of the end caps 16, 18. More specifically, in some embodiments, the cover 46 and the inner wall 48 can at least partially surround a portion of a perimeter of the stator end turns 28 so that the cover 46, the slinger 44, and a portion of the inner wall 48 can at least partially define a stator cavity 50. In some embodiments, the stator cavity 50 can be positioned substantially around the stator end turns 28. In other embodiments, the stator cavity 50 can be positioned around other portions of the stator assembly 26. In some embodiments, the stator cavity 50 can be in fluid communication with the coolant apertures 42. In some embodiments, the cover 46 can be coupled to the inner wall 48 by conventional fasteners, welding, or other similar conventional coupling techniques. In some embodiments, the cover 46 can be integral with the inner wall 48 and the end caps 16, 18 so that the cover 46, the inner wall 48, and each of the end caps 16, 18 can be considered one unitary body. Also, in some embodiments, the cover 46 can comprise a substantially non-conductive material, such as a polymer, glass, plastic, or other non-conductive materials.

In some embodiments, the cover 46 can axially extend into the machine cavity 22 from the inner wall 48. More specifically, to at least partially define the stator cavity 50, the cover 46 can extend axially inward toward the slinger 44, as shown in FIG. 2. In some embodiments, the cover 46 can be can extend a desired distance from the end caps 16, 18. The desired distances can be uniform or vary along radial portions of, or along the circumference of, the electric machine 20, and, as a result, the stator cavity 50, can be uniform or can vary in size. In addition, in some embodiments, the stator cavity 50 and the cover 46 may not extend around the entire 360 degrees of the stator end turns 28. Furthermore, a volume of the stator cavity 50 can be the volume necessary for maximum energy transfer, as generally required by end-use applications.

In some embodiments, the end caps 16, 18 can each include an end cap coolant jacket 52, although, in some embodiments, either one of or neither of the end caps 16, 18 include the end cap coolant jacket 52. More specifically, in some embodiments, the end cap coolant jackets 52 can be positioned in the end caps 16, 18 so that the end cap coolant jackets 52 are proximal to the stator end turns 28 and can extend around the entire 360 degrees of the stator end turns 28, although the end cap coolant jackets 52 need not extend the entire 360 degrees. In some embodiments, the end cap coolant jackets 52 can be positioned so that they are substantially adjacent to the stator cavity 50, as shown in FIG. 2. In some embodiments, the end cap coolant jackets 52 can contain the first or the second coolant. Also, the end cap coolant jackets 52 can be in fluid communication with either the first or second coolant source (not shown), depending on the coolant contained within the end cap coolant jackets 52. The coolant source can pressurize the coolant prior to or as it is being dispersed into the end cap coolant jackets 52, so that the pressurized coolant can circulate through the end cap coolant jackets 52.

In some embodiments, the slinger 44 can substantially form a hydrodynamic seal of the stator cavity 50. More specifically, in some embodiments, the synchronous movement of the slinger 44 can substantially prevent material amounts of the second coolant from exiting the stator cavity 50. For example, the generally continuous movement of the slinger 44 can continuously sling the portions of the second coolant which splashes and/or drips radially downward to the slinger 44 back toward the stator end turns 28, which, in some embodiments, can create a substantial seal of the stator cavity 50. Eventually, in some embodiments, a portion of the second coolant can be deposited on the cover 46 where it can naturally flow to the bottom of the housing 12 because of gravity.

As the second coolant flows inside the stator cavity 50, substantially along a portion of the cover 46, further cooling can occur. In some embodiments, because the end cap coolant jackets 52 can be positioned substantially adjacent to the stator cavity 50, the end cap coolant jackets 52 can receive, through convection, a portion of the heat energy that the second coolant received from contact with the stator end turns 28 and other portions of the module 10. Additionally, in some embodiments, the module 10 can contain a drain (not shown) positioned substantially at or near a bottom portion of the stator cavity 50, which can fluidly connect to a heat-exchange element. In some embodiments, after reaching the drain, the second coolant can flow to the heat-exchange element where a portion of the heat energy remaining with the second coolant can be largely transferred and the second coolant can be recirculated for further cooling.

In some embodiments, the end caps 16, 18 can comprise multiple cooling configurations. In some embodiments, the end caps 16, 18 can comprise a generally semi-sealed configuration, a generally semi-open configuration, or other configurations which can enhance module 10 cooling. In some embodiments, one, both, or neither end cap 16, 18 can include at least one of the different configurations.

According to some embodiments of the invention, the end caps 16, 18 comprising the generally semi-sealed configuration can include a plurality of semi-sealed chambers 54. In some embodiments, the end caps 16, 18 can include partitions coupled to the end caps 16, 18, which can form the plurality of semi-sealed chambers 54. In some embodiments, the partitions can be coupled to the end caps 16, 18 using conventional fasteners (not shown) or other conventional coupling techniques and methods. In other embodiments, the partitions can be substantially integral with the end caps 16, 18 so that the end caps 16, 18 and the partitions are substantially one unitary body.

For example, in some embodiments, an inner partition 58 and an outer partition 60 can be coupled to the end caps 16, 18. In some embodiments, the inner partition 58 and the outer partition 60 can comprise a generally circular shape. In other embodiments, the partitions 58, 60 can comprise other shapes such as square, rectangular, or other regular or irregular polygonal shapes. In some embodiments, the outer partition 60 can be coupled to the end caps 16, 18 at a generally more radially outward position relative to the inner partition 58. Further, in some embodiments, the inner partition 58 and the outer partition 60 can generally include a concentric relationship with respect to each other. As a result, in some embodiments, the outer partition 60 can include a larger circumference than the inner partition 58.

Figure 3A:
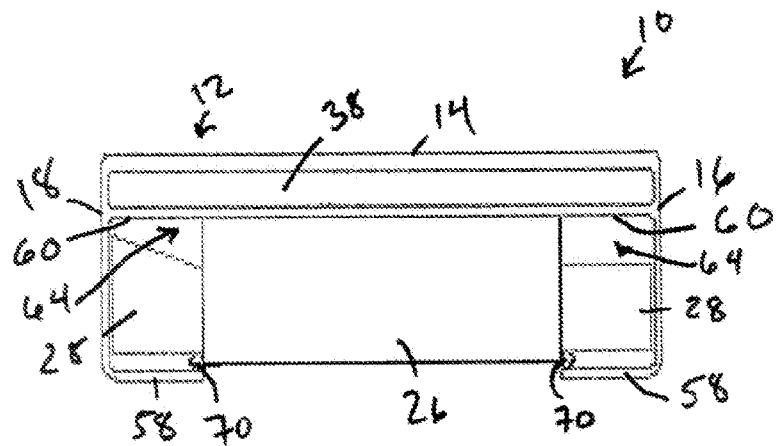
FIG. 3A is a partial cross-sectional view of an electric machine module according to one embodiment of the invention.
Figure 3B:
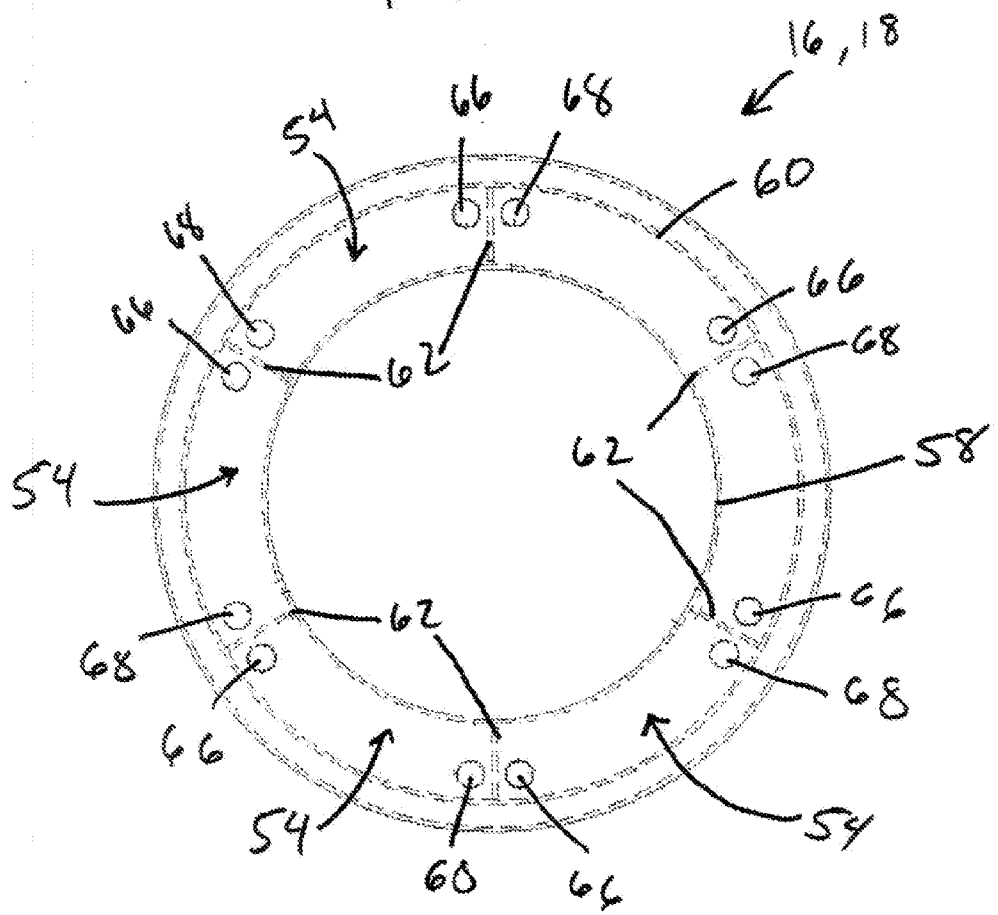
FIG. 3B is side view of an end cap according to one embodiment of the invention.

Furthermore, in some embodiments, cross partitions 62 can be positioned substantially between the inner partition 58 and the outer partition 60. Additionally, in some embodiments; the cross partitions 62 can include an aperture (not shown) to receive portions of the electric machine 20, upon assembly. For example, as shown in FIG. 3B, in some embodiments, the cross partitions 62 can extend from an inner diameter of the outer partition 60 to an outer diameter of the inner partition 58, so that the partitions 58, 60, and 62 and portions of the end caps 16, 18 can substantially define the plurality of semi-sealed chambers 54. The partitions 58, 60, and 62 can extend a distance from the end caps 16, 18. In some embodiments, the distance can be largely determined by electric machine 20 dimensions and end-use applications. In some embodiments, six cross partitions 62 can be included so that the end caps 16, 18 can include six semi-sealed chambers 54, as shown in FIG. 3A. In other embodiments, any number of cross partitions 62 can be included, as can any number of semi-sealed chambers 54. Further, in some embodiments, the number of cross partitions 62 and semi-sealed chambers 54 need not be the same. Additionally, in some embodiments, the partitions 58, 60, 62 can comprise substantially non-conductive materials such as a plastic, glass, or another polymeric material.

Referring to FIG. 3A, according to some embodiments of the invention, when the housing 12 is substantially assembled around the electric machine 20, the semi-sealed chambers 54 can substantially surround portions of a perimeter of the stator end turns 28. In some embodiments, the semi-sealed chambers 54, portions of the electric machine 20, and portions of the end caps 16, 18 can form a plurality of semi-sealed stator cavities 64 substantially surrounding portions of the stator end turns 28. In some embodiments, each semi-sealed stator cavity 64 can span approximately 60 degrees of the total 360 degrees around the stator end turns 28. In some embodiments, each semi-sealed stator cavity 64 need not span 60 degrees and can span any portion of the stator end turns 28.

In some embodiments, the semi-sealed chambers 54 can each contain a coolant inlet 66 and a coolant outlet 68. Also, in some embodiments, each semi-sealed chamber 54 can include only coolant inlets 66, only coolant outlets 68, more than one coolant inlet 66 and/or coolant outlet 68, or neither a coolant inlet 66 nor a coolant outlet 68. In some embodiments, a third coolant can flow through the coolant inlets 66. In some embodiments, the third coolant can comprise the first coolant, the second coolant, or a combination thereof. Furthermore, in some embodiments, the coolant inlets 66 can be positioned substantially axially outward from the stator end turns 28, so that as the third coolant exits the coolant inlets 66, the coolant inlets 66 can substantially direct the third coolant axially inward toward the stator end turns 28. In some embodiments, the coolant inlets 66 need not be positioned substantially axially outward and can be positioned in other locations within the semi-sealed chambers 54.

In some embodiments, the coolant inlets 66 can be fluidly connected to a fluid source (not shown) which can pressurize the third coolant prior to or as it is being dispersed through the coolant inlets 66, so that the pressurized third coolant can circulate through the coolant inlets 66 and be dispersed into the semi-sealed stator cavity 64.

In some embodiments, the semi-sealed stator cavities 64 can each include a seal member 70, although not all of the semi-sealed stator cavities 64 need include the seal member 70. The seal member 70 can be positioned generally between a radially inner portion of the stator end turns 28 and an outer diameter of the inner partition 58 so that a substantial portion of the third coolant remains within the semi-sealed stator cavity 64. In some embodiments, the seal member 70 can allow a portion of the third coolant to circulate from the semi-sealed stator cavity 64 to the machine cavity 22, where the third coolant can contact other module 10 components, such as, but not limited to the rotor 24. Additionally, in some embodiments, a portion of the third coolant can flow from the semi-sealed stator cavities 64 through the aperture of the cross partitions 62. As a result, in some embodiments, the semi-sealed stator cavities 64 can be substantially semi-sealed (i.e., not completely liquid-tight).

In some embodiments, after entering the semi-sealed stator cavity 64, the third coolant can aid in cooling. For example, in some embodiments, the third coolant can flow through the coolant inlets 66 under generally low pressure and at a medium velocity, which can increase turbulence inside of the semi-sealed stator cavity 64, which, as a result, can at least partially increase heat-energy transfer from some electric machine 20 components, such as the stator end turns 28, to the third coolant.

In some embodiments, after circulating through the semi-sealed stator cavity 64, a portion of the third coolant can flow through the coolant outlets 68. In some embodiments, the third coolant can be directed to flow out of the semi-sealed stator cavities 64, through the coolant outlets 68, by the incoming pressurized third coolant flowing through the coolant inlets 66. In some embodiments, after flowing through the coolant outlets 68, the second coolant can be guided to a sump area (not shown) through flow channels (not shown) fluidly connected to each of the coolant outlets 68. In some embodiments, each of the coolant outlets 68 can be connected to a coolant trough (not shown) which can be formed in the end caps 16, 18. Additionally, in some embodiments, the sump area and/or the coolant trough can fluidly connect to a heat-exchange element (not shown) where a portion of the heat energy can be transferred and the third coolant can be recirculated for further cooling.

In some embodiments, the end caps 16, 18 can include an end cap heat exchange structure (not shown). In some embodiments, the end cap heat exchange structure can comprise a coolant reservoir (not shown) configured to receive heat energy from the third coolant circulating through the coolant outlets 68. More specifically, the coolant reservoir can contain the first coolant, the second coolant, or a different coolant and can be fluidly connected to a coolant source (not shown) which can pressurize the coolant prior to or as it is being dispersed into the coolant reservoir, so that the pressurized coolant can circulate through the coolant reservoir. Heat energy can be transferred from the third coolant at the end cap heat exchange structure, and the coolant circulating through the end cap heat exchange structure can substantially circulated out of the housing 12 and to a heat-transfer element (e.g., a radiator, a heat exchanger, etc.), which can remove the heat energy from the coolant and then the coolant can be recirculated through the end cap heat exchange structure. Additionally, the end cap heat exchange structure can receive heat energy generated by the electric machine 20 through convection, which can further enhance module 10 cooling. Moreover, because the housing 12 can comprise materials of a generally thermally conductive nature, the housing 12 can further aid in cooling because the heat energy can be more easily transferred relative to embodiments not including a housing 12 comprised of thermally conductive materials.

Figure 4A:
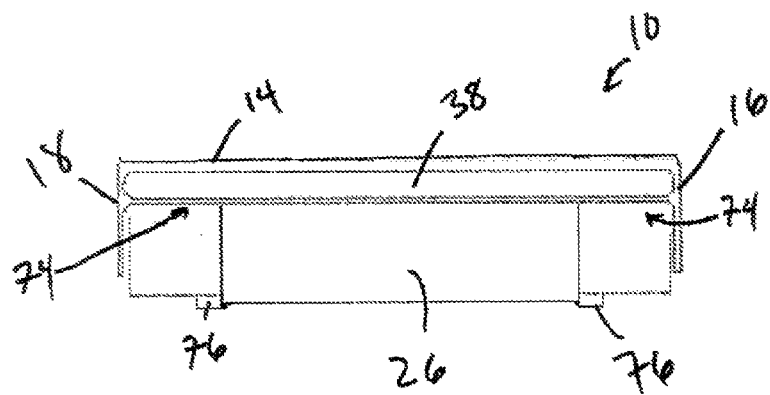
FIG. 4A is a partial cross-sectional view of an electric machine module according to one embodiment of the invention.
Figure 4B:
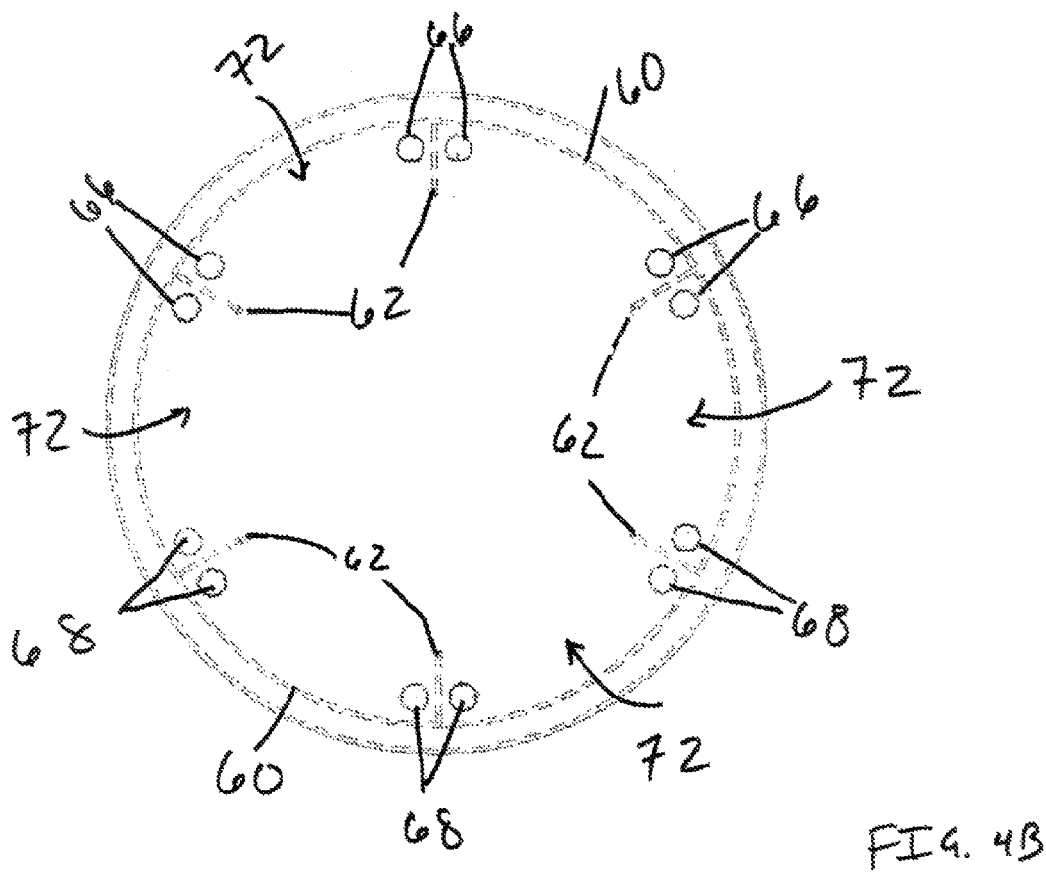
FIG. 4B is side view of an end cap according to one embodiment of the invention

Referring to FIGS. 4A and 4B, according to some embodiments of the invention, the end caps 16, 18 can comprise the generally semi-open configuration. In some embodiments, the end caps 16, 18 comprising the generally semi-open configuration can comprise semi-open chambers 72. In some embodiments, the partitions can be coupled to the end caps 16, 18 to form the semi-open chambers 72. Similar to the semi-sealed chambers 54, the semi-open chambers 72 can comprise an outer partition 60 and cross partitions 62. In some embodiments, the semi-open chambers 72 can substantially lack the inner partition 58, so that when the housing 12, including end caps 16, 18 comprising the semi-open chambers 72, is substantially assembled around the electric machine 20, a semi-open stator cavity 74 can be formed.

Referring to FIG. 4A, in some embodiments, the semi-open stator cavity 74 can be substantially formed by the semi-open chambers 72, portions of the electric machine 20, and portions of the end caps 16, 18. Additionally, the semi-open chamber 72 can substantially surround portions of the perimeter of the stator end turns 28. The semi-open stator cavity 74 can be in fluid communication with the machine cavity 22. In some embodiments, each semi-open stator cavity 74 can span approximately 60 degrees of the total 360 degrees around the stator end turns 28. In some embodiments, each semi-open stator cavity 74 need not span 60 degrees and can span any portion of the stator end turns 28.

In some embodiments, the semi-open chambers 72 can each include coolant inlets 66 and/or coolant outlets 68. For example, in some embodiments, the semi-open chambers 72 positioned in a generally upper half of the housing 12, relative to a horizontal axis of the output shaft 36, can include coolant inlets 66, and the semi-open chambers 72 positioned in a generally lower half of the housing 12, relative to the horizontal axis of the output shaft 36, can include coolant outlets 68, as shown in FIG. 4B. In some embodiments, each semi-open chamber 72 can include at least one coolant inlet 66 and/or at least one coolant outlet 68, or in other embodiments, some semi-open chambers 72 can comprise neither a coolant inlet 66 nor a coolant outlet 68. In some embodiments, the third coolant can flow through the coolant inlets 66. Furthermore, in some embodiments, the coolant inlets 66 can be positioned substantially axially outward from the stator end turns 28, so that as the third coolant exits the coolant inlets 66, they can substantially direct the third coolant axially inward toward the stator end turns 28. In some embodiments, the coolant inlets 66 need not be positioned substantially axially outward and can be positioned in other locations within the semi-open chambers 72. In some embodiments, the coolant inlets 66 can be fluidly connected to a fluid source (not shown) which can pressurize the third coolant prior to or as it is being disbursed through the coolant inlets 66, so that the pressurized third coolant can circulate through the coolant inlets 66 and through portions of the semi-open stator cavity 74.

In some embodiments, after entering the semi-open stator cavities 74, the third coolant can aid in cooling portions of the electric machine 20. For example, in some embodiments, the third coolant can flow through the coolant inlets 66 under generally medium pressure and at a high velocity, which can increase turbulence inside of the semi-open stator cavity 74, which, as a result, can at least partially increase heat-energy transfer from electric machine 20 components, such as the stator end turns 28, to the third coolant.

In some embodiments, coolant guides 76 can be coupled to the electric machine 20 to at least partially guide portions of the third coolant entering the semi-open stator cavities 74. For example, the coolant guides 76 can be coupled to the electric machine 20 near the radially inner portion of the stator end turns 28, so that as the third coolant enters the semi-open stator cavities 74 and flows substantially over and through the stator end turns 28, at least a portion of the third coolant can contact the coolant guides 76 and can remain substantially near to the stator end turns 28. Further, the coolant guides 76 can substantially prevent a portion of the third coolant from directly entering the machine cavity 22. Further, in some embodiments, the coolant guides 76 can comprise a substantially non-conductive material such as a polymer, plastic, glass, or similar substance. Additionally, in some embodiments, the slinger 44 can function as a coolant guide 76, and, as previously mentioned, can aid in concentrating coolant in and around the stator end turns 28 and substantially preventing a portion of the coolant from directly entering the machine cavity 22.

In some embodiments, after entering the semi-open stator cavities 74, the third coolant can be drained through the coolant outlets 68. More specifically, in some embodiments, after the third coolant enters the semi-open stator cavities 74, it can flow around and through the stator end turns 28. As previously mentioned, in some embodiments, a portion of the third coolant can contact the coolant guides 76 and/or the slinger 44 and can remain proximal to, or in contact with the stator end turns 28. Because, in some embodiments, the semi-open stator cavities 74 are in fluid communication with the machine cavity 22, at least a portion of the third coolant can enter the machine cavity 22 and flow over and around, and receive heat energy from some components of the electric machine 20, including the rotor 24. Eventually, due to gravity, the third coolant can flow toward the bottom of the housing 12, where, in some embodiments, at least some of the coolant outlets 68 can be located, as shown in FIG. 4B.

In some embodiments, the coolant outlets 66 can drain a portion of the third coolant. In some embodiments, the draining can be substantially passive and/or substantially active. More specifically, in some embodiments the coolant outlets 66 can be coupled to a heat exchange system (not shown), which, in some embodiments, can receive substantial portions of the heat energy transported by the third coolant from the electric machine 20. In some embodiments, the third coolant can enter the coolant outlets 66 at or near the bottom of the housing 12 based on gravity (i.e., the second coolant can passively be transported through the coolant outlets 66 and into the heat exchange system). In some embodiments, the second coolant can enter the coolant outlets 66 at or near the bottom of the housing 12 based on active actions by the heat exchange system (i.e., the second coolant can be pulled into the heat exchange system through the application of suction to the coolant outlets 66).

Additionally, in some embodiments, heat energy also can be transferred from the third coolant to the first coolant as it enters the first coolant jacket 38. As previously mentioned, a first coolant jacket inlet can be positioned substantially at or neat the bottom of the housing 12. In some embodiments, because at least a portion of the third coolant can drain to the bottom of the housing 12, as the first coolant enters the first coolant jacket 38, a portion of the heat energy received by the third coolant can be conducted through the thermally conductive housing 12 and into the first coolant as it enters the first coolant jacket 38.

Some of the previously mentioned embodiments can enhance module 10 cooling. In some embodiments, by including the first and the second coolant jackets 38, 40, and/or the semi-open or semi-sealed stator cavities 64, 74, generally convection-based cooling and directed cooling can occur. More specifically, in some embodiments, the first coolant circulating through the first coolant jacket 38 can receive, through convection, a portion of the heat energy radiated by the electric machine 20. Furthermore, in some embodiments, the second coolant circulating through the second coolant channel 40 and disbursed through the coolant apertures 42 onto the stator assembly 26 and/or the stator end turns 28 can receive, through direct contact, a portion of the heat energy produced by these components. Also, in some embodiments, the coolant circulating through the end cap coolant jackets 52 can receive a portion of the heat energy received by the second coolant after it contacts some of the module 10 components.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

The invention claimed is:

1. An electric machine module comprising:
    a housing including a sleeve member and at least one end cap, the housing at least partially defining a machine cavity,
        the sleeve member including a first coolant jacket and a second coolant jacket, the first coolant jacket configured to contain a first coolant, and the second coolant jacket configured to contain a second coolant, and
        the at least one end cap including an end cap coolant jacket, the end cap coolant jacket configured to contain at least a portion of one of the first coolant and the second coolant; and
    an electric machine comprising a stator assembly including stator end turns, the electric machine at least partially enclosed within the housing, and the end cap coolant jacket positioned substantially axially outward relative to at least one of the stator end turns,
    the first coolant jacket and the second coolant jacket each substantially circumscribing at least a portion of the outer diameter of the stator assembly.

2. The electric machine module of claim 1, wherein at least a portion of the first coolant jacket and at least a portion of the second coolant jacket each substantially circumscribe at least a portion of the stator assembly outside of the stator end turns.

3. The electric machine module of claim 1, wherein sleeve member comprises more than one first coolant jacket and more than one second coolant jacket.

4. The electric machine module of claim 1, wherein the electric machine comprises a rotor assembly including a rotor, a slinger operatively coupled to the rotor and extending substantially axially outward along at least a portion of an axial length of at least one of the stator end turns.

5. The electric machine module of claim 4, wherein the slinger is configured to form a hydrodynamic seal substantially around a portion of at least one of the stator end turns.

6. The electric machine module of claim 1, and further comprising a cover coupled to the at least one end cap, the cover extending substantially axially inward into the machine cavity along at least a portion of an axial length of at least one of the stator end turns, so that a stator cavity is formed by at least the slinger, the cover, and the at least one end cap.

7. The electric machine module of claim 6, and further comprising coolant apertures through a portion of the sleeve member so that the second coolant jacket is in fluid communication with the stator cavity.

8. An electric machine module comprising:
    a housing comprising a sleeve member and including at least one end cap, the housing at least partially defining a machine cavity at least partially enclosing a stator assembly,
        the at least one end cap comprising at least one semi-sealed chamber, and
        the at least one semi-sealed chamber including a coolant inlet and a coolant outlet;
    an electric machine including stator end turns, the electric machine at least partially enclosed within the housing;
    a semi-sealed stator cavity formed by at least a portion of the electric machine, a portion of the at least one end cap, and the at least one semi-sealed chamber, a portion of the stator end turns substantially extend into the semi-sealed stator cavity; and
    wherein the sleeve member includes a first coolant jacket substantially circumscribing a portion of an outer diameter of the stator assembly and a second coolant jacket substantially circumscribing a portion of an outer diameter of the stator assembly.

9. The electric machine module of claim 8, wherein the semi-sealed stator cavity comprises a seal member.

10. The electric machine module of claim 8, wherein at least a portion of the first coolant jacket and at least a portion of a second coolant jacket each substantially circumscribes a portion of the outer diameter of the stator assembly outside of the stator end turns, the first coolant jacket configured to contain a first coolant and the second coolant jacket configured to contain a second coolant.

11. The electric machine module of claim 8, wherein the semi-sealed stator cavity is in fluid communication with the machine cavity.

12. The electric machine module of claim 8, wherein the semi-sealed chamber comprises an inner partition, an outer partition, and at least one cross partition.

13. The electric machine module of claim 8, wherein the semi-sealed chamber comprises substantially non-conductive materials.

14. The electric machine module of claim 8, wherein the housing comprises a thermally conductive material.

15. An electric machine module comprising:
a housing including a sleeve member and at least one end cap, the housing at least partially defining a machine cavity at least partially enclosing a stator assembly,
the at least one end cap comprising a plurality of semi-open chambers, and
at least one of the plurality of semi-open chambers including a coolant inlet, at least one of the plurality of semi-open chambers including a coolant outlet;
an electric machine including stator end turns, the electric machine at least partially enclosed within the housing;
a semi-open stator cavity formed by at least a portion of the electric machine, a portion of the at least one end cap, and at least one of the plurality of semi-open chambers, a portion of the stator end turns substantially extend into the semi-open stator cavity; and
wherein the sleeve member includes a coolant jacket substantially circumscribing a portion of an outer diameter of the stator assembly, the coolant jacket configured to contain a coolant; and
wherein the sleeve member further comprises coolant apertures through a portion of the sleeve member so that the coolant jacket is in fluid communication with the stator cavity.

16. The electric machine module of claim 15, wherein the semi-open stator cavity is in fluid communication with the machine cavity.

17. The electric machine module of claim 15, wherein the at least one of the plurality of semi-open chambers including the coolant inlet is positioned in a generally upper half of the housing, and the at least one of the plurality of semi-open chambers including the coolant outlet is positioned in a generally lower half of the housing.

18. The electric machine module of claim 15, wherein the coolant jacket substantially circumscribing a portion of the stator assembly outside of the stator end turn.

19. The electric machine module of claim 15, wherein the electric machine includes a coolant guide.

20. The electric machine module of claim 19, wherein the electric machine comprises a rotor assembly including a rotor, the coolant guide comprises a slinger operatively coupled to the rotor and extending substantially axially outward along at least a portion of an axial length of at least one of the stator end turns, the semi-open stator cavity further formed by the slinger.

* * * * *